Dec. 23, 1941.   J. W. McNAIRY   2,267,410
CONTROL SYSTEM
Filed Jan. 21, 1941

Inventor:
Jacob W. McNairy,
by Harry E. Dunham
His Attorney.

Patented Dec. 23, 1941

2,267,410

UNITED STATES PATENT OFFICE 2,267,410

CONTROL SYSTEM

Jacob W. McNairy, Bridgeport, Conn., assignor to General Electric Company, a corporation of New York Application January 21, 1941, Serial No. 375,125

16 Claims. (Cl. 188—173)

My invention relates to control systems and particularly to electric circuit control arrangements for electromagnets.

Electric vehicle driving motors are frequently provided with spring-applied electromagnetically-released friction brakes. Where brakes of this type are used for heavy duty service, it is sometimes necessary to provide a high voltage coil for picking up the solenoid to release the brakes although the solenoid may be held in picked up position by a holding coil energized from the relatively low control voltage. With such an arrangement it is desirable to delay the deenergization of the pick-up coil until after the holding coil has been energized. However, in the event that sudden reapplication of braking is called for before the deenergization of the pick-up coil in its ordinary sequence, it is not desirable to delay the deenergization in the pick-up coil.

Accordingly, it is an object of my invention to provide a control system for an electromagnet having a pick-up coil and a holding coil.

It is a further object of my invention to provide, in a solenoid brake having a pick-up coil and a holding coil, a pick-up coil having delayed drop out in normal operation and instantaneous drop out if the brake is reapplied before the completion of a normal brake releasing sequence.

According to one embodiment of my invention, the pick-up coil contactor for a brake-releasing solenoid is provided with short circuiting means operated in conjunction with the holding coil contactor. Thus, if the contactor controlling the holding coil has been picked up, the deenergization of the pick-up coil is normally delayed to insure a prior full energization of the holding coil, but may be brought about instantaneously in an emergency by deenergizing the holding coil contactor. If, on the other hand the contactor controlling the holding coil has not yet picked up no time delay will have been introduced and the pick-up coil may be deenergized instantly to reapply the brakes. Furthermore, if the holding coil has been energized and the pick-up coil dropped out with its normal time delay, the brakes may be instantly reapplied by deenergizing the holding coil contactor.

Figure 1:
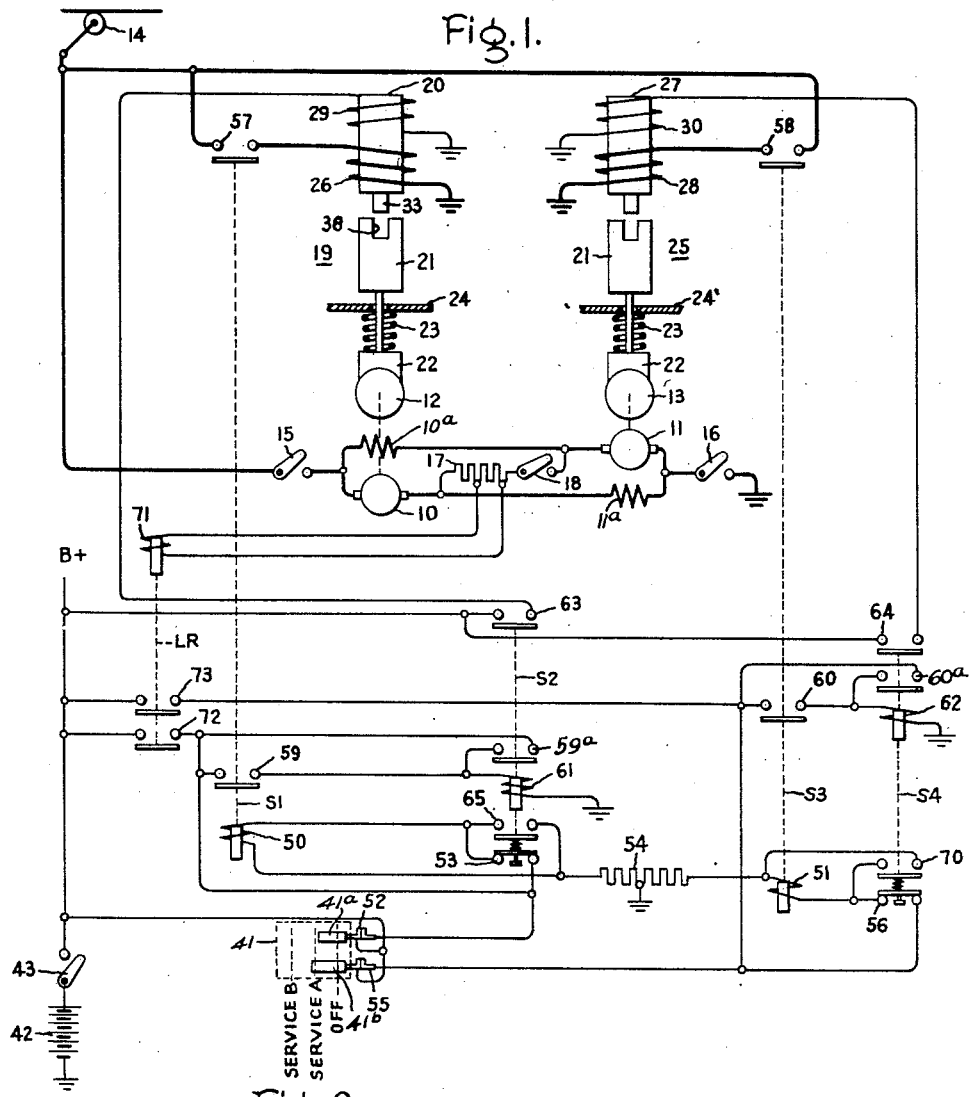
Figure 2:
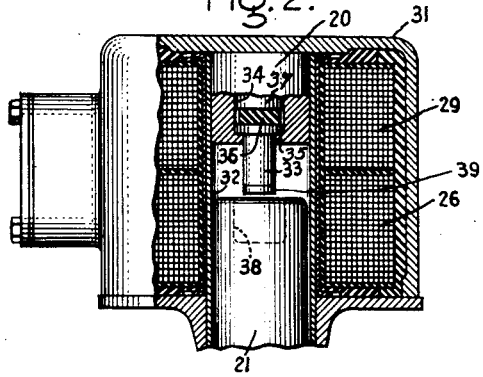

In order that my invention may be more completely understood, I shall now refer to the accompanying drawing, in which Fig. 1 is a simplified circuit diagram showing my invention applied to the control of a pair of solenoid operated electric vehicle friction brakes, while Fig. 2 is a side view, partly in section, of one of the solenoids.

Referring now particularly to Fig. 1, I have shown a pair of direct current series driving motors 10 and 11 connected in parallel and provided with series fields 10a and 11a respectively. Braking drums 12 and 13 are connected to the motors 10 and 11 respectively. The motors may be connected in series between a high voltage trolley 14 and ground by closing the line switches 15 and 16, and may be cross-connected in a double loop circuit with a resistor 17 for dynamic braking by opening the switches 15 and 16 and closing the braking switch 18. Such a braking connection is more fully described in my Patent 2,120,954, issued June 14, 1938, and assigned to the same assignee as the present application. While I have shown the switches 15, 16 and 18 as manually operated, it will be understood, of course that, if desired, they may be automatically operated by any suitable control system many of which are well known to those skilled in the art.

A solenoid brake 19 comprises a stationary core 20 and an armature or plunger 21. The armature 21 is attached to a brake shoe 22 which is biased into frictional engagement with the brake drum 12 by springs 23 bearing at one end on the brake shoe 22 and at the other end on a stationary portion 24 of the frame of the vehicle. A solenoid brake 25 of similar construction is arranged for cooperation with the brake drum 13. Elements of the armature assembly of the brake 25 corresponding to those of the armature assembly of the brake 19 have been assigned like reference numerals. The stationary core 20 of the brake 19 is arranged to be energized from the trolley 14 by a pick-up coil 26, while a core 27 of the brake 25 is arranged to be energized from the trolley 14 by a pick-up coil 28. The core 20 of the brake 19 is also provided with a holding coil 29, and the core 27 of the brake 25 is provided with a holding coil 30.

In Fig. 2 I have shown a detailed view, partly in section, of the operating solenoid for the solenoid brake 19. As disclosed in my copending application Serial No. 386,904 filed April 4, 1941, and assigned to the same assignee as the present application, this solenoid is provided with a rubber buffer for minimizing the noise incident to the picking up of the armature. In particular, the solenoid comprises a casing 31 of magnetic material within which is centrally arranged a guiding tube 32 and the stationary core 20. Between the casing 31 and the tube 32 and suitably insulated therefrom as shown, are the annular operating coils 26 and 29. The armature 21 is movable within the tube 32 into and out of engagement with the face of the stationary core 20. Extending from the face of the stationary core 20 is a small pin 33, partially retractable into a recess 34 in the core and provided with a shoulder 35. Within the recess 34 is fixed a rubber buffer 36 positioned to engage the shoulder 35 and backed up by a plug 37 of magnetic material located in the recess 34. In order to permit iron to iron contact between the armature 21 and the core 20, the armature 21 is provided with a recess 38 for the reception of the extending end of the pin 33. The construction shown, comprising the pin 33 extending into the recess 38 during the upward stroke of the armature 21 has for its purpose the reduction of the characteristic increase in magnetic pull as the air gap between the core 20 and armature 21 is reduced. A more uniform solenoid operating force is obtained by this construction due to the fact that, as the pin 33 extends farther into the recess 38, the leakage path between the sides of the pin and the sides of the recess increases in area and diminishes in reluctance. As the leakage flux increases, the face of the core 20 becomes saturated, with the effect that the operating flux crossing the air gap between the core and armature is limited in amount. The leakage flux exerts no operating force, since its direction is transverse to the direction of movement of the armature 21. The reduction of the rate of increase of magnetic pull as the armature approaches the core assists in cushioning the impact of the armature and core and protects the rubber buffer 36 from excessive wear. For adjustment of the pin 33 a shim 39 may be provided.

In operation, as the armature 21 is raised by the magnetic force of the pick-up coil 26, the pin 33 first engages the bottom of the recess 38 and is raised with the armature. Before the face of the armature comes into contact with the face of the core 20 the pin 32, now in engagement with the armature, compresses the rubber buffer 35 to cushion the force of the impact between the armature and the core. The rubber buffer 35 is sufficiently resilient so that it does not prevent iron to iron contact between the plunger 21 and the core 20.

For control of the motors 10 and 11 and the solenoid brakes 19 and 25 I have shown a braking controller having a rotatable drum 41 carrying contact controlling cams 41a and 41b. The cams 41a and 41b are arranged to close cooperating contact fingers 52 and 55 respectively when in engagement therewith and to permit these contacts to open under the influence of suitable biasing springs when the drum 41 is rotated to a position such that the cams 41a and 41b are out of engagement with their respective contact fingers, as indicated schematically upon the drawing. The various operating positions of the controller drum 41 are indicated by suitably identified vertical broken lines. The motor controlling contact fingers and cams on the controller 41 have not been shown, since they form no part of the present invention. The preferred embodiment of my invention also includes a local source of control voltage, such as a car battery 42, and a plurality of control contactors S1, S2, S3 and S4.

In operation, both solenoid brakes 19 and 25 are held released when the braking controller 41 is in its "off" position; the brake 19 is applied in service position A of the controller 41; and both brakes are applied in service position B of the controller. Assuming that the solenoid armatures 21 are deenergized and that the controller is in its "off" position, a control switch 43 may be closed to connect the battery 42 to the positive control bus B+. Through the control switch 43 energizing circuits are completed for the operating coils 50 and 51 of the contactors S1 and S3 respectively. The energizing circuit for the operating coil 50 may be traced from the control bus B+ through a contact finger 52 of the controller 41, a pair of interlock contacts 53 of the contactor S2, the operating coil 50 of the contactor S1 and a portion of a resistor 54 to ground. The energizing circuit for the operating coil 51 may be traced, in like manner, from the positive control bus B+ through a contact finger 55 of the controller 41, a pair of interlock contacts 56 of the contactor S4, the operating coil 51 and a portion of the resistor 54 to ground. With these circuits completed the contactors S1 and S3 will pick up and close their respective contacts 57 and 58 to complete energizing circuits for the pick-up coils 26 and 28 of the solenoid brakes 19 and 25 respectively. The energizing circuit for the pick-up coil 26 may be traced from the trolley 14 through the contacts 57 of the contactor S1 and the coil 26 to ground; while the energizing circuit for the pick-up coil 28 may be traced from the trolley 14 through the contacts 58 of the contactor S3 and the coil 28 to ground.

When the contactors S1 and S3 pick up they also close their respective interlock contacts 59 and 60 to complete energizing circuits for the operating coils 61 and 62 of the contactors S2 and S4 respectively. The energizing circuit for the operating coil 61 may be traced from the positive control bus B+ through the contact finger 52 of the controller 41, the interlock contacts 59 of the contactor S1 and the operating coil 61 to ground. The energizing circuit for the operating coil 62 may be traced from the positive control bus B+ through the contact finger 55 of the controller 41, the interlock contacts 60 of the contactor S3 and the operating coil 62 to ground. When the contactors S2 and S4 pick up they complete locking-in circuits for themselves through their respective interlock contacts 59a and 60a which are connected in parallel to the interlock contacts 59 and 60 of the contactors S1 and S3 respectively. While these energizing circuits are being completed the armatures 21 of the solenoid brakes 19 and 25 are, of course, picking up under the influence of the pick-up coils 26 and 28. When the contactors S2 and S4 pick up they complete energizing circuits for the holding coils 29 and 30 of the solenoid brakes 19 and 25 respectively, complete short circuits around the operating coils 50 and 51 of the pick-up coil contactors S1 and S3 respectively to give the contactors S1 and S3 a time delay drop out characteristic, and then open the energizing circuits for the coils 50 and 51. Tracing first the energizing circuit for the solenoid holding coil 29 of the solenoid brake 19, this circuit may be followed from the positive control bus B+ through a pair of contacts 63 on the contactor S2, and the coil 29 to ground; while the energizing circuit for the holding coil 30 of the brake 25 may be traced from the positive control bus B+ through a pair of contacts 64 on the contactor S4, and the coil 30 to ground. When the contactor S2 picks up it also closes a pair of interlock contacts 65 to complete a shunt circuit about the operating coil 50 of the contactor S1 and subsequently opens its interlock contacts 53 to disable the energizing circuit of the coil 50. In like manner the contactor S4 in picking up first completes a shunt circuit about the coil 51 by closing a set of interlock contacts 70 and then disables the energizing circuit for the coil 51 at its interlock contacts 56. Thus while current is building up in the holding coils 29 and 30 of the solenoids the energization of the high voltage pick-up coils 26 and 28 is maintained for a short time due to the gradual deenergization of the short circuited operating coils 50 and 51 of the contactors S1 and S3 respectively. The gradual deenergization of the contactors S1 and S3 whereby they possess a delayed drop-out characteristic is brought about by the short circuiting of the operating coils 50 and 51 before the magnetic energy stored in these coils has been dissipated. As is well understood, the decay of flux in the magnetic circuit of a short circuited coil generates a transient voltage which gives rise to a current in such a direction as to momentarily maintain the flux. This provides a gradually diminishing self energization and consequent delayed drop-out of the contactor.

From the above description of the operation it will be evident that in a braking system according to my invention the brakes are released by a pick-up coil energized from the relatively high voltage trolley conductors and are held released by a holding coil energized from a relatively low voltage local source of supply, as a car battery. This feature provides protection against setting of the brakes upon a momentary failure of trolley voltage, while also permitting the use of the relatively high trolley voltage for energizing the pick-up coil. There is no objection to using the trolley voltage for the initial release of the brakes, for if no trolley voltage is available to release the brakes, the driving motors could not be energized in any event.

The function of the resistor 54 will now be apparent. When the contacts 65 of the contactor S2 shunt the operating coil 50 of the contactor S1 before the contacts 53 of the contactor S2 break the energizing circuit for the coil 50, the control bus B+ would be connected directly to ground for an instant unless the energizing circuit for the coil 50 contained some impedance other than the coil 50 itself. The portion of the resistor 54 in circuit with the coil 50 is such a current limiting impedance. Likewise, the portion of the resistor 54 in circuit with the coil 51 of the contactor S3 is a current limiting impedance for that energizing circuit.

If now the braking controller 41 is placed in its service position A, the solenoid brake 19 will be reapplied by deenergization of the holding coil 29. When the controller 41 is placed in its service position B the brake 25 will be applied by deenergization of the holding coil 30. It will be apparent from the circuits previously traced that the opening of the contact fingers 52 and 55 will disable the energizing circuits for the operating coils 61 and 62 of the contactors S2 and S4 respectively. When the contactors S2 and S4 drop out they will disable the holding coils 29 and 30 respectively. All the control circuits will thus be returned to their initial condition.

In order to insure that the solenoid brakes 19 and 25 are held released during the operation of dynamic braking a lock-out relay LR is provided. The relay LR is arranged to be energized by an operating coil 71 energized across a portion of the braking resistor 17. A pair of interlock contacts 72 on the lock-out relay LR is shunted across the contact finger 52, while another pair of interlock contacts 73 on the lock-out relay is shunted across the contact finger 55. It will be apparent that the solenoid brakes may be energized through the contacts 72 and 73 in the same manner as through the contact fingers 52 and 55.

As has been described, the pick-up coil contactor S1 possesses a time delay drop out characteristic in ordinary operation due to the action of the overlapping interlock contacts 53 and 65 on the contactor S2, and the pick-up coil contactor S3 possesses a time delay drop out characteristic due to the over-lapping operation of the interlock contacts 56 and 70 on the contactor S4. This arrangement, while providing the time delay drop out ordinarily desired, also insures that the pick-up coil contactors S1 and S3 will drop out instantaneously and will immediately deenergize the pick-up coils 26 and 28 if a sudden reapplication of braking is called for before completion of a normal brake releasing sequence. In this case the contactors S2 and S4, if picked up will drop out instantaneously and disable the loop circuit through the operating coils 50 and 51 of the contactors S1 and S3. The contactors S1 and S3 will therefore drop out instantaneously. If, on the other hand, the coil contactors S2 and S4 have not yet picked up, no loop circuits will yet have been completed through the operating coils 50 and 51 of the contactors S1 and S3.

It will now be seen that my control system possesses operating characteristics far superior to those which could be obtained by the use of a conventional short circuited copper ring for producing time delay in the drop out of the pick-up coil contactors S1 and S3. A short circuited copper turn on the contactors S1 and S3, while providing a delayed drop out as desired in ordinary operation, will also provide the same delayed drop out at times when it was not desired, such as when a sudden reapplication of braking is called for before the contactors S1 and S3 have dropped out in their ordinary sequence.

While I have shown and described but one preferred embodiment of my invention, I wish to have it understood that I do not wish to be limited thereto and that I therefore intend by the appended claims to cover all such modifications as fall within the true spirit and scope of my invention.

What I claim as new and desire to secure by Letters Patent of the United States, is:

1. In combination, an electromagnet having an armature, a pick-up coil for said armature, a holding coil for said armature, first energizing means for said pick-up coil, second energizing means for said holding coil, and time element means connected to said second energizing means to disable said first energizing means after said armature has completed its pick-up stroke.

2. In combination, an electromagnet having an armature, a pick-up coil for said armature, a holding coil for said armature, switching means for connecting said pick-up coil to a source of energy, energizing means for said holding coil, and means operated by said energizing means for disabling said switching means a predetermined time interval after said holding coil is energized.

3. In combination, an electromagnet having an armature, a pick-up coil for said armature, a holding coil for said armature, switching means for connecting said pick-up coil to a source of energy, second switching means for connecting said holding coil to a source of energy, and means associated with said second switching means and operable gradually to disable said first switching means.

4. In combination, an electromagnet having an armature, a pick-up coil for said armature, a holding coil for said armature, switching means for connecting said pick-up coil to a source of energy, operating means for said first switching means, second switching means for connecting said holding coil to a source of energy, and contact means associated with said second switching means and operable gradually to disable said operating means.

5. In combination, an electromagnet having an armature, a pick-up coil for said armature, a holding coil for said armature, first switching means for connecting said pick-up coil to a source of energy, operating means for said first switching means, second switching means for connecting said holding coil to a source of energy, and contact means associated with said second switching means operable to disable said operating means and to provide time element means associated with said operating means.

6. In combination, an electromagnet having an armature, a pick-up coil for said armature, a holding coil for said armature, first switching means for connecting said pick-up coil to a source of energy, operating means for said first switching means, energizing means associated with said operating means, second switching means for connecting said holding coil to a source of energy, and contact means associated with said second switching means operable to provide time element means operable in conjunction with said operating means and subsequently to disable said energizing means.

7. In combination, an electromagnet having an armature, a pick-up coil for said armature, a holding coil for said electromagnet, first switching means for connecting said pick-up coil to a source of energy, an operating coil for said first switching means, energizing means for said operating coil, second switching means for connecting said holding coil to a source of energy, and contact means associated with said second switching means for shunting said operating coil and subsequently disabling said energizing means.

8. In combination, an electromagnet having an armature, a pick-up coil for said armature, a holding coil for said armature, first switching means for connecting said pick-up coil to a source of energy, an operating coil for said first switching means, energizing means for said operating coil, second switching means for connecting said holding coil to a source of energy, and interlocked control means associated with said second switching means for disabling said energizing means and shunting said operating coil.

9. In combination, an electromagnet having an armature, a pick-up coil for said armature, a holding coil for said armature, first switching means for connecting said pick-up coil to a source of energy, an operating coil for said first switching means, energizing means for said operating coil, second switching means for connecting said holding coil to a second source of energy, a first contact operated by said second switching means to shunt said operating coil, and a second contact sequentially operable by said second switching means to disable said energizing means.

10. In combination, an electromagnet having an armature, a pick-up coil for said armature, a holding coil for said armature, first switching means for connecting said pick-up coil to a first source of energy, an operating coil for said first switching means, energizing means for said operating coil, a resistor in series with said coil, second switching means for connecting said holding coil to a second source of energy, a first contact operable by said second switching means to shunt said operating coil, and a second contact sequentially operable by said second switching means to disable said energizing means.

11. In combination, a spring applied friction brake, an electromagnet for releasing said brake, a pick-up coil for said electromagnet, a holding coil for said electromagnet, first switching means for connecting said pick-up coil to a source of power, an operating coil for said first switching means, energizing means for said operating coil, second switching means for connecting said holding coil to a second source of power, a first contact operated by said second switching means to shunt said operating coil, and a second contact sequentially operable by said second switching means to disable said energizing means.

12. In combination, an electromagnet having an armature, a pick-up coil for said armature, a normally open switching means movable to a closed circuit position to energize said pick-up coil, a holding coil for said armature, a second normally open switching means movable to a closed circuit position to energize said holding coil, an operating connection between said switching means for closing said second switching means when said first switching means is closed, and time element means operated by said second switching means for opening said first switching means a predetermined time interval after the energization of said holding coil.

13. In a solenoid brake for an electrically driven vehicle, a friction brake shoe movable to braking and brake releasing positions, spring means for normally biasing said shoe to its braking position, a solenoid having a stationary core and an armature connected to said shoe and movable against the bias of said spring means to move said shoe to its brake releasing position, a source of relatively high unidirectional voltage, a pick-up coil mounted upon said stationary core, first switching means for connecting said pick-up coil to said source of relatively high voltage, an operating coil for said first switching means, energizing means for said operating coil, a resistor in series with said coil, a source of relatively low unidirectional voltage, a holding coil mounted upon said stationary core, second switching means for connecting said holding coil to said source of relatively low voltage, a first contact operable by said second switching means to shunt said operating coil, and a second contact sequentially operable by said second switching means to disable said energizing means.

14. In a braking system for an electrically driven vehicle provided with a driving motor, connections for energizing said motor from a source of electric supply, a friction brake movable to braking and brake releasing positions, spring means for normally biasing said brake to its braking position, an electromagnet for releasing said brake against the bias of said spring, a pick-up coil for said electromagnet, a holding coil for said electromagnet, switching means for connecting said pick-up coil to the same source of electric supply as said motor, second switching means for connecting said holding coil to a local source of electric energy on said vehicle, and time element means operable in conjunction with said second switching means to disable said first switching means.

15. In a braking system for an electrically driven vehicle provided with a driving motor, connections for energizing said motor from a source of electric supply, a battery positioned upon said vehicle, a friction brake shoe movable to brake releasing position, spring means for normally biasing said shoe to its brake position, an electromagnet having an armature connected to said shoe and movable against the bias of said spring means to move said shoe to its brake releasing position, a pick-up coil for said armature, a holding coil for said armature, first switching means for connecting said pick-up coil to the same source of electric supply as said motor, second switching means for connecting said holding coil to said battery, and means operated by said second switching means for disabling said first switching means a predetermined time interval after said holding coil is energized.

16. In a braking system for an electrically driven vehicle provided with a driving motor, connections for energizing said motor from a source of electric supply, a battery located upon said vehicle, a friction brake shoe movable to braking and brake releasing positions, spring means for normally biasing said shoe to its braking position, a solenoid having a stationary core and an armature connected to said shoe and movable against the bias of said spring means to move said shoe to its brake releasing position, a pick-up coil mounted upon said core, a holding coil mounted upon said core, first switching means for connecting said pick-up coil to the same source of electric supply as said motor, operating means for said first switching means, energizing means associated with said operating means, second switching means for connecting said holding coil to said battery, and contact means associated with said second switching means operable to provide time element means operable in conjunction with said operating means and subsequently to disable said energizing means.

JACOB W. McNAIRY.